US011394235B2

(12) United States Patent
Maji et al.

(10) Patent No.: US 11,394,235 B2
(45) Date of Patent: Jul. 19, 2022

(54) POWER CONVERSION SYSTEM AND METHOD

(71) Applicant: SIGNIFY HOLDING B.V., Eindhoven (NL)

(72) Inventors: Goutam Maji, Eindhoven (NL); Priya Ranjan Mishra, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 287 days.

(21) Appl. No.: 16/610,651

(22) PCT Filed: May 1, 2018

(86) PCT No.: PCT/EP2018/061070
§ 371 (c)(1),
(2) Date: Nov. 4, 2019

(87) PCT Pub. No.: WO2018/202641
PCT Pub. Date: Nov. 8, 2018

(65) Prior Publication Data
US 2020/0076226 A1    Mar. 5, 2020

(30) Foreign Application Priority Data

May 5, 2017 (IN) .............................. 201741015917
Sep. 1, 2017 (EP) .................................... 17188962

(51) Int. Cl.
*H02J 7/35* (2006.01)
*G05F 1/67* (2006.01)
*G06F 1/26* (2006.01)
*H02J 1/10* (2006.01)
*H02J 3/38* (2006.01)
(Continued)

(52) U.S. Cl.
CPC .................. *H02J 7/35* (2013.01); *G05F 1/67* (2013.01); *G06F 1/263* (2013.01); *H02J 1/10* (2013.01);
(Continued)

(58) Field of Classification Search
CPC ...... H02J 7/35; H02J 1/10; H02J 3/383; H02J 2207/40; G05F 1/67; G06F 1/263;
(Continued)

(56) References Cited

U.S. PATENT DOCUMENTS 8,648,498 B1 * 2/2014 West ....................... H02J 3/381
307/82
9,013,061 B2    4/2015 Siri
(Continued)

FOREIGN PATENT DOCUMENTS

CN        102193561 A       9/2011
DE        10136147 B4      11/2004
(Continued)

*Primary Examiner* — Stacy Whitmore

(57) ABSTRACT

A power conversion system is to be used with an energy source. A plurality of conversion units are used in series via their output with the energy source output. A positive pin of a first converter and the negative pin of a last converter of the series are for connection to an output (14, 16) of the energy source, and for each two neighboring converters in this series a negative pin of an upstream converter is connected to a positive pin of a downstream converter which both pins are decoupled from the energy source except for the positive pin of the first converter and the negative pin of the last converter. A master monitor unit is adapted to monitor the output power of the energy source and to control the input voltage of each conversion unit synchronously in dependence on the monitored output power. In this way, a set of conversion units are configured, with the conversion units sharing the output from the energy source. This provides a scalable system.

15 Claims, 2 Drawing Sheets

(51) Int. Cl.
*H02M 3/158* (2006.01)
*H02M 1/00* (2006.01)

(52) U.S. Cl.
CPC ........... *H02J 3/383* (2013.01); *H02M 3/1584* (2013.01); *H02J 2207/40* (2020.01); *H02M 1/0074* (2021.05)

(58) Field of Classification Search
CPC ... H02M 3/1584; H02M 1/0074; Y02B 10/10; Y02E 10/56
See application file for complete search history.

(56) References Cited

U.S. PATENT DOCUMENTS

| | | |
|---|---|---|
| 11,125,833 B1 * | 9/2021 | Wallisch ............ G01R 31/3277 |
| 2010/0020576 A1 | 1/2010 | Falk |
| 2013/0008808 A1 | 1/2013 | Lee et al. |
| 2013/0088081 A1 | 4/2013 | Siri |
| 2013/0241298 A1 * | 9/2013 | Ishii ....................... H02M 7/44 |
| | | 307/82 |
| 2016/0111962 A1 * | 4/2016 | Mao ....................... H02M 1/36 |
| | | 363/21.16 |

FOREIGN PATENT DOCUMENTS

| | | |
|---|---|---|
| WO | 2014040625 A1 | 3/2014 |
| WO | 2014190300 A1 | 11/2014 |
| WO | 2015170903 A1 | 11/2015 |
| WO | 2017/061177 A1 | 4/2017 |

* cited by examiner

POWER CONVERSION SYSTEM AND METHOD

CROSS-REFERENCE TO PRIOR APPLICATIONS

This application is the U.S. National Phase application under 35 U.S.C. § 371 of International Application No. PCT/EP2018/061070, filed on May 1, 2018, which claims the benefit of European Patent Application No. 17188962.9, filed on Sep. 1, 2017, and Indian Patent Application No. 201741015917, filed on May 5, 2017. These applications are hereby incorporated by reference herein.

FIELD OF THE INVENTION

This invention relates to power conversion systems and methods, and in particular to systems for converting power from a variable power source.

BACKGROUND OF THE INVENTION

Power conversion systems are used to collect energy from an energy source and to deliver the energy to a load or energy storage system. They are for example widely used for collecting energy from renewable energy sources.

For example solar energy generation utilizing the rooftop areas of buildings is becoming increasingly popular around the world. In order to utilize the rooftop area for solar power generation in high rise buildings needs a long distance of wiring to reach the base of the building. In order to reduce the capital investment, solar power plant owners now are increasingly interested in installing the solar photovoltaic (PV) plant at low cost land and using long distance cables for power distribution to the load. The load may be the utility grid or it may be battery points.

As load requirements change, the system needs to be scaled up, by adding more solar PV cells, and their associated power conversion systems such as maximum power point tracking (MPPT) system, charge controllers and batteries. This generally requires a rewiring of the system.

The rewiring cost, in particular the need to put new wiring in a high rise building or over long distances to a solar PV farm, involve a large material expenditure and service cost. For example, people may connect new PV cells and a new conversion system, but this connection needs to travel over the long distances again. Every time the system is scaled up, a new and long connection is needed. Even in the case of a small solar power enhancement such as a standalone solar street lighting system which is to be upgraded with higher light output or longer hours of light output, there is a need for a replacement or additional solar panel, a different MPPT charge controller, possibly another battery with higher capacity and new wiring.

There is therefore a need for a solution to reduce this rewiring cost when scaling a system. This scaling is needed when there are higher load requirements.

US20130088081A1 discloses a multisource power system wherein each power source is connected to a respective converter, and the converters are series connected for a ease of ground referencing.

SUMMARY OF THE INVENTION

The invention is defined by the claims.

It is a concept of the invention to simplify system upgrades for power conversion systems, for example when a power or energy requirement changes. A modular system using multiple conversion units may be used, wherein the multiple conversion units are connected in series and share the input voltage provided to the system, so that additional units may be added to respond to an increased input voltage. In a series connection, the new conversion unit is added at the converter site by a short wiring to the existing conversion units, and the existing long wiring between the solar cell site and the converter site does not need to be modified, which saves a lot of cost. The concept of the invention also proposes a solution to control the series connected conversion units to reach the maximum power point synchronously such that the series connected conversion units balance the output of an energy source, e.g. solar cell array.

According to examples in accordance with an aspect of the invention, there is provided a power conversion system to be used with an energy source, comprising:

a plurality of conversion units, each comprising a pair of input terminals and a pair of output terminals, wherein the input terminals are connected in series with the energy source, wherein the positive input terminal of a first converter and the negative input terminal of a last converter of the series are for connection to an output of the energy source, and for each two neighboring converters in this series a negative input terminal pin of an upstream converter is connected to a positive input terminal of a downstream converter which both input terminals are decoupled from the energy source except for the positive input terminal of the first converter and the negative input terminal of the last converter;

a master monitor unit adapted to monitor the output power of the energy source; and a controller adapted to control the input voltage of each conversion unit synchronously in dependence on the monitored output power.

This system provides multiple conversion units in series across the input. This means they share the input voltage, i.e. the output voltage from the energy source, but the energy source current which is delivered passes to each conversion unit. The conversion units are controlled to change their conversion ratio synchronously, according to a variance of the output power. Each conversion unit for example functions as a maximum power point tracking system, but each one only receives a fraction of the input voltage. Thus, they are controlled as a set of conversion units so that in combination they set the desired operating voltage for the energy source to achieve maximal or near maximal power transfer. A particular advantage of this configuration is that it is easily scalable, by adding additional conversion units. These may be added for example in conjunction with a change to the energy source configuration. Thus, the conversion system may be easily scaled when the energy source is scaled.

The output terminals are preferably connected in parallel.

In this way, each conversion unit has the same output voltage. The conversion ratio of each conversion unit thus sets the input voltage, and these input voltages in combination set the operating voltage of the energy source.

Further, said controller is adapted to: detect a total output voltage from the energy source; and set a reference voltage (Vr) for each conversion units (10); and each conversion units (10) is associated with a drive circuit to generate and provide the conversion unit an output based on the difference between the reference voltage (Vr) set by the controller (32) and a feedback of the individual differential voltage of each conversion unit.

This provides a simple control loop wherein only one voltage is sensed to control the multiple conversion units.

The controller is for example adapted to:
simultaneously change the input voltage of each conversion unit in a first direction starting from a reference value;
check if the output power is increasing or is decreasing; and
continue to simultaneously change the input voltage in the first direction if the output power is increasing; otherwise simultaneously change the input voltage in a second direction opposite to the first direction.

This provides a perturb and observe maximum power point tracking approach to find the optimum operating point for the energy source. Of course other known maximum power point tracking approaches may be used.

The plurality of conversion units may have the same rated power, and the controller is adapted to set the same input voltage and the same step of a change in the input voltage for the plurality of conversion units; or the plurality of conversion units may have different rated power, and the controller is adapted to set an input voltage and the step of a change in the input voltage for the plurality of conversion units depending on their different rated power.

If the conversion units have the same rated power, they may be used to divide the energy source voltage equally (with some tolerance), and hence they may all be controlled to have the same input voltage, although locally the input voltage may be adapted to take account of local differences, for example different input impedances. This provides a simple control scheme.

Instead, the conversion units may have different rated power. This means the power transfer rate from the energy source may be adjustable. For example, different conversion units will have different power transfer rates. The overall operating voltage maintained at the energy source may be constant (at the required MPPT operating point), but it may be divided between the different conversion units in different proportions, thus changing the overall power transfer rate, but still maintaining the same point of operation of the energy source.

For example, an installed energy source (e.g. solar PV cell array) may have a power of 1000 W, to be processed by four 200 W conversion units and two 100 W conversion units in series. The 200 W units need to have higher voltage share than 100 W units. Power rate adjustment is needed to prevent that any of the 100 W units fail by transferring excess power and hence performing at overrated levels. With proper voltage sharing, the overall system is able to operate at a desired peak maximum power point.

This is of interest for legacy systems where there are already different wattage conversion units, and a new conversion unit with a different power rating is to be added. For new installations, it will typically be preferred to have the same power conversion units in series for easy control.

When the plurality of conversion units have the different rate power, the controller is for example adapted to set an input voltage and the step of the change in the input voltage for the plurality of conversion units proportional to their different rated power. The advantage of this approach is ease of control, as the voltage division is a linear/proportional division.

Each conversion unit may comprise a switched mode power supply with a main power switch, wherein a duty cycle of a control voltage applied to the main power switch determines the input voltage, wherein the controller is adapted to control the duty cycle.

This provides a simple way to control the conversion units. The conversion units may then simply function as controllable DC-DC converters with PWM (pulse width modulation) control. The PWM value controls the conversion ratio of the DC-DC converter.

The output terminals of the conversion units are for example for connection to a battery pack. The system is then for storing energy derived from solar power.

The system is preferably scalable by adding an additional conversion unit by connecting the input terminals of the additional conversion unit within the series connection of input terminals of the plurality of conversion units.

The scaling is simple and low cost. Each conversion unit may perform a maximum power point tracking function, but the conversion units may be implemented as simple DC-DC converters since part of the MPPT functionality is implemented by the master controller, which is shared between all conversion units.

The invention also provides a solar power generation system comprising:
a set of solar panels; and
a power conversion system as defined above, with the end input terminals connected to the set of solar panels.

Preferably, the output terminals of the solar panels are also connected in series. This provides a further ease of scaling the solar panels, especially if the solar panels have different output voltage. If a new solar panel is to be added, it can be added in series with the existing solar panels by a short wiring, and the existing long wiring between the solar cell site and the converter site does not need to be modified, which saves a lot of cost.

Further, the positive output terminal of a first solar panel and the negative output terminal of a last solar panel of the series are for connection respective to positive input terminal of the first converter and the negative input terminal of the last converter, and for each two neighboring solar panel in this series a negative output terminal pin of an solar panel is connected to a positive output terminal of a downstream solar panel which both output terminals are decoupled from the converters except for the positive output terminal of the first solar panel and the negative output terminal of the last solar panel. This provides a simpler way of adding solar panels into the system without rewiring new solar panels to the conversion units.

The system may further comprise a battery arrangement connected to the output terminals.

Examples in accordance with another aspect of the invention provide a power conversion method, comprising:
receiving energy from an energy source;
providing a plurality of conversion units, each comprising a pair of input terminals and a pair of output terminals, wherein the input terminals are connected in series with the energy source and positive input terminal of a first converter and the negative input terminal of a last converter of the series are connected to the energy source, wherein for each two neighboring converters in this series a negative input terminal pin of an upstream converter is connected to a positive input terminal of a downstream converter which both input terminals are decoupled from the energy source except for the positive input terminal of the first converter and the negative input terminal of the last converter;
monitoring the output power of the energy source; and
controlling the input voltage of across each conversion unit synchronously in dependence on the monitored output power.

This method provides sharing of the voltage output from the energy source between multiple conversion units. The overall system may perform maximum power point tracking.

The method may comprise:

simultaneously changing the input voltage of each conversion unit in a first direction starting from a reference value;

checking if the output power from is increasing or is decreasing; and continuing to simultaneously change the input voltage in the first direction if the output power is increasing; otherwise simultaneously changing the input voltage in a second direction opposite to the first direction.

If the plurality of conversion units have the same rated power the method may comprise setting the same input voltage and the same step of change of the input voltage for the plurality of conversion units.

If the plurality of conversion units have different rated power the method may comprise setting an input voltage and the step of change of the input voltage for the plurality of conversion units depending on their different rated power.

Each conversion unit may comprise a switched mode power supply with a main power switch, and the method comprises setting an input voltage by controlling a duty cycle of a control voltage applied to the main power switch.

Examples in accordance with another aspect of the invention provide a method of scaling an energy conversion system as defined above, wherein the method comprises:

adding an additional conversion unit by connecting the input terminals of the additional conversion unit within the series connection of input terminals of the plurality of conversion units.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a power conversion system to be used with an energy source, in which a plurality of conversion units are used in series via their input, with the energy source output. A master monitor unit is adapted to monitor the output power of the energy source, and to control the input voltage of each conversion unit synchronously in dependence on the monitored output power. In this way, a set of conversion units are configured, with the conversion units sharing the output from the energy source. This provides a scalable system.

Figure 1:
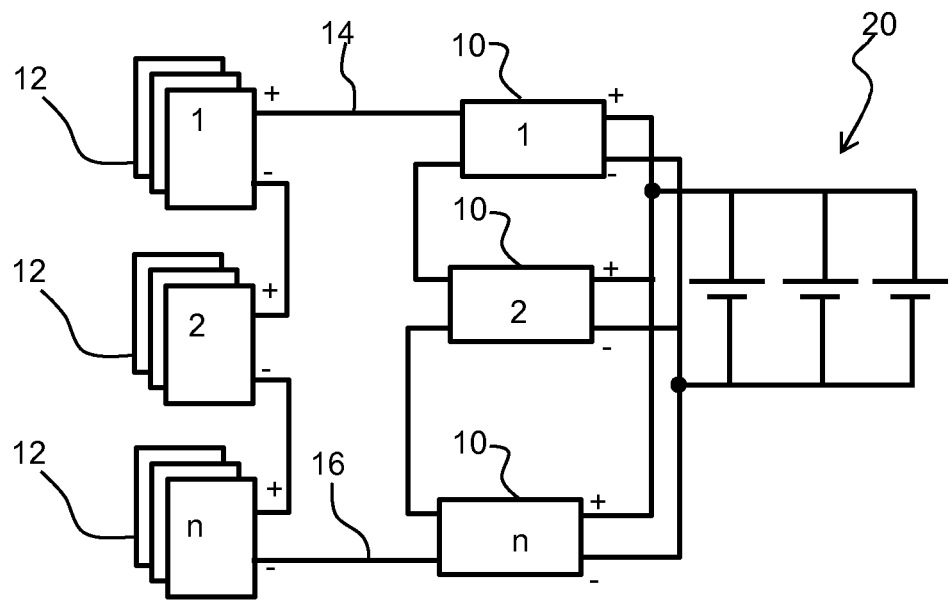
FIG. 1 shows the general architecture of an energy conversion system.

FIG. 1 shows the general configuration of the system. The system comprises a set of conversion units 10 (shown as numbered 1 to n). Each conversion unit performs maximum power point tracking, although as explained below, each one may have a reduced functionality compared to a conventional full MPPT system. The system is connected to an energy source which is shown a set of solar panels 12 (each of which comprises a solar cell array of one or more solar cells) forming a solar system. Each conversion unit 10 comprises a pair of input terminals and a pair of output terminals. The input terminals are connected in series between a global positive input 14 and a global negative input 16. The solar cell arrays are also shown connected in series so that they have single pair of outputs which form the global inputs 14, 16. The system may be connected to any energy supply, which delivers variable energy. When the energy supply comprises multiple units, such as the multiple solar panels of FIG. 1, they may be connected in series as shown but they may also be in parallel.

The outputs of the conversion units are in this example connected in parallel to a battery arrangement 20 comprising a set of parallel battery cells. The battery arrangement may have any other configuration, such as series connection. The system may also be used to couple energy to the grid, instead of or as well as enabling energy storage in the battery arrangement.

This system provides multiple conversion units in series across the input. This means they share the input voltage, i.e. the output voltage from the energy source on the global inputs 14, 16. The energy source current which is delivered passes to each conversion unit.

The conversion units for example comprise switched mode DC-DC converters, having a DC-DC conversion ratio. The conversion ratio may be set by a control input in the form of a reference signal. This reference signal controls the duty cycle of a main power switch of the DC-DC converter.

The conversion units are controlled to change their conversion ratio synchronously, according to a variance of the output power of the solar system. The conversion units are controlled synchronously to reach the optimum i.e. maximum output power output of the solar system. In combination, the conversion units set the desired operating voltage for the energy source to achieve maximal or near maximal power transfer. The arrangement is scalable by adding additional conversion units 10.

The system thus operates series connected conversion units which may be in the form of modified MPPT converters or indeed simple DC-DC converters at their maximum power point. Each individual conversion unit controls its own input voltage.

In a first example, all of the conversion units are of equal rated power. By way of example, three solar panels may connected in series as shown in FIG. 1. The first and second solar panels may be part of an existing system and the third is a newly added panel to be incorporated into the system. The conversion units 10 are of suitable power rating and are in the form of input-output decoupled MPPT charge controllers. When all of the conversion units are of the same power rating, and charge a parallel connected battery bank or a single high power battery, the conversion units will try to extract maximum power from the solar panel to charge the common battery individually. In such a configuration, all conversion units will experience the same current and a voltage across each conversion unit which depends on the conversion ratio. The equation for maximum power point tracking operation of the complete system is:

$$P\text{total\_series} = I_{sol} * (V1 + V2 + \ldots Vn)$$

Where Isol is the total current drawn from the energy source (i.e. solar system), Vk is the voltage across the kth conversion unit, and Ptotal_series is the total power drawn from the solar system.

If the system is operated in standalone mode with the first solar panel having a first independent conversion unit to charge the battery and the second solar panel with a second independent conversion unit etc., the maximum power point tracking operation of the individual solar system is as follows.

$$P1=I1*V1$$

$$P2=I2*V2,$$

$$\ldots$$

$$Pn=In*Vn.$$

Hence, the total power equation is:

Ptotal_individual=P1+P2+ . . . Pn; where Pk is the maximum power that can be delivered by the kth solar panel, Vk is the voltage across the kth conversion unit, Ik is the current drawn by the kth conversion unit, and Ptotal_series is the total power drawn from the solar system.

In order to achieve the same power point tracking performance with the series-connected panel system as for the individual performance case, Ptotal_series must be equal to Ptotal_individual.

In the ideal scenario, V1 and V2 and Vn will be same and equal to Vsol/n (where Vsol is the solar system output voltage) in order to share power equally and operate the whole system at the maximum power point to charge the battery.

However, small input impedance differences among the conversion units can cause unequal voltage sharing so that V1, V2 and Vn will not be the same in a practical scenario. Even though V1, V2 and Vn are not equal, so that the conversion units are operating at different power levels, system level maximum power point tracking can still be achieved.

Therefore even though all conversion units are of equal power rating, if the conversion units all allowed to operate independently, some may operate at higher power compared to others.

Figure 2:
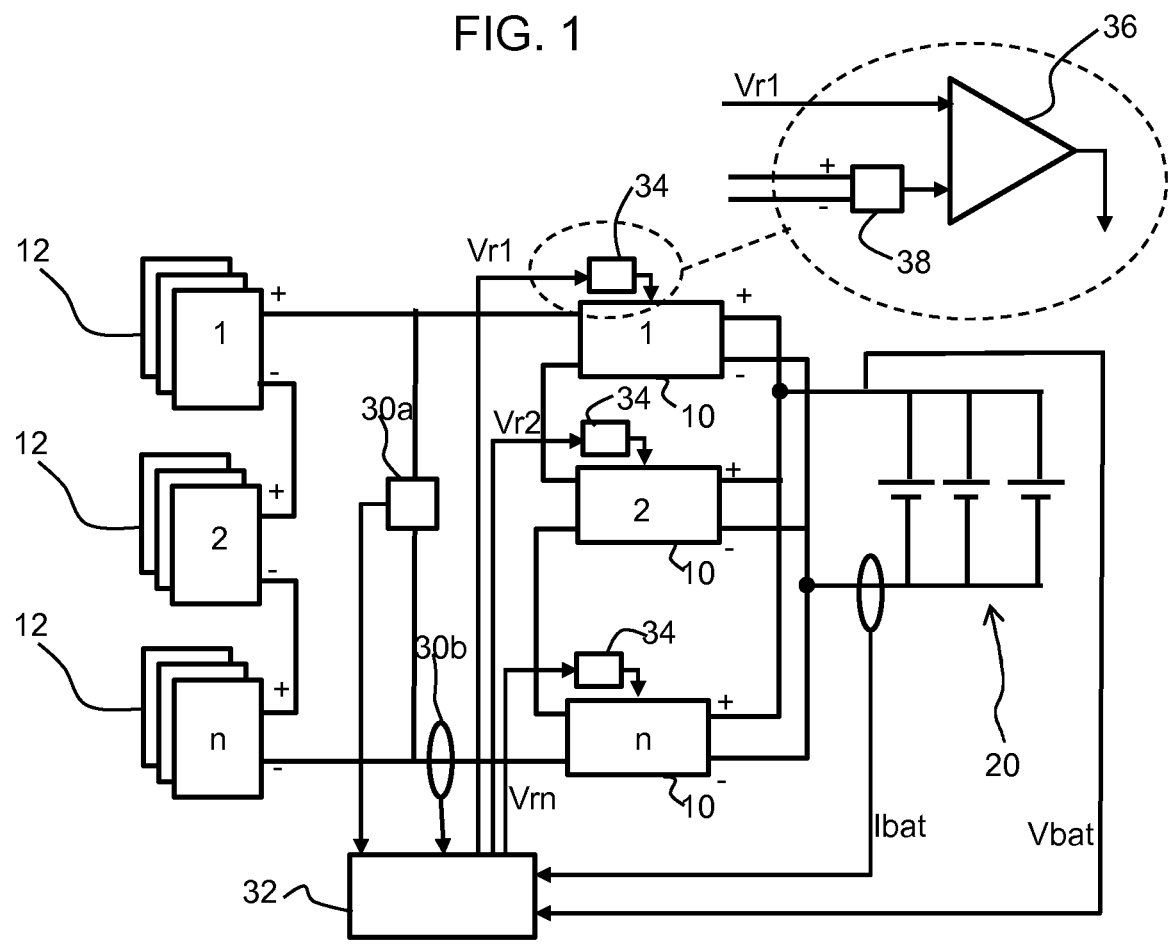
FIG. 2 shows an energy conversion system in more detail with the control components.

Instead of allowing each conversion unit to operate independently, an overall system control is provided. The additional components required for overall system control are shown in FIG. 2.

The system includes a master monitor unit 30a, 30b adapted to monitor the output power of the energy source (i.e. the solar cell arrangement) and a controller 32 adapted to control the input voltage of each conversion unit synchronously in dependence on the monitored output power. The master monitor unit comprises a voltage sensing circuit 30a for sensing the voltage between the global input terminals 14, 16 and a current sensing circuit 30b (such as a current sense resistor and a voltage measurement circuit) for monitoring the total current flowing from (and back to) the solar cell arrangement.

The controller 32 ensures an almost equal voltage sharing among all of the conversion units and achieves better system stability as well as ensuring equal resource utilization. The controller 32 functions as a master to control all of the conversion units. In this way, the conversion units do not need to be full MPPT systems, since part of the sensing functionality is provided by the master monitor and controller. The conversion units may be considered to be modified MPPT converters, and they may be implemented as simple DC-DC converters with pulse width modulation control only.

The controller 32 monitors the solar system voltage and current continuously and also monitors the battery voltage Vbat and the battery current Ibat and provides a suitable voltage reference to all of the conversion units based on a conventional MPPT algorithm. Thus, the overall MPPT operation is implemented the controller 32 whereas each individual conversion unit operate as a simple DC-DC converter. The overall MPPT algorithm may for example comprise a perturb and observe algorithm or any other algorithm.

FIG. 2 shows voltage references Vr1, Vr2 and Vrn for the conversion units 10. These reference voltages are provided to drive circuits 34, one of which is shown in more detail in FIG. 2. The drive circuit comprises an error amplifier 36 which generates an output based on the difference between the reference voltage Vr set by the controller 32 and feedback of the individual differential voltage of each conversion unit. FIG. 2 shows a subtraction unit 38 which receives the local positive and negative input voltages for that particular conversion unit, and this means the way the overall voltage is divided between the conversion units is taken into account.

This approach means that even if the same reference is provided to each conversion unit, if those conversion units have different input impedance and hence receive a different proportion of the input voltage, the conversion ratio is adjusted accordingly. If a conversion unit has a high impedance and hence a larger proportion of the input voltage is across its input terminals, a lower PWM signal value will result and a lower conversion ratio. This provides self-regulation of the power sharing between the different conversion units. In this way, the problem of different conversion units operating at different powers, and hence possibly operating outside their rated power, is addressed.

The controller 32 generates a reference voltage for all of the series-connected conversion units based on the battery voltage, battery current, energy source voltage and energy source current. The individual conversion units then generate a PWM signal for their own operation based on the received reference voltage from controller 32 and their own differential input voltage. Thus, even if all of the reference voltages are the same, a different PWM signal may result due to the different input impedances of the conversion units. Each conversion unit thus controls and keeps its own differential voltage within a control limit.

Figure 3:
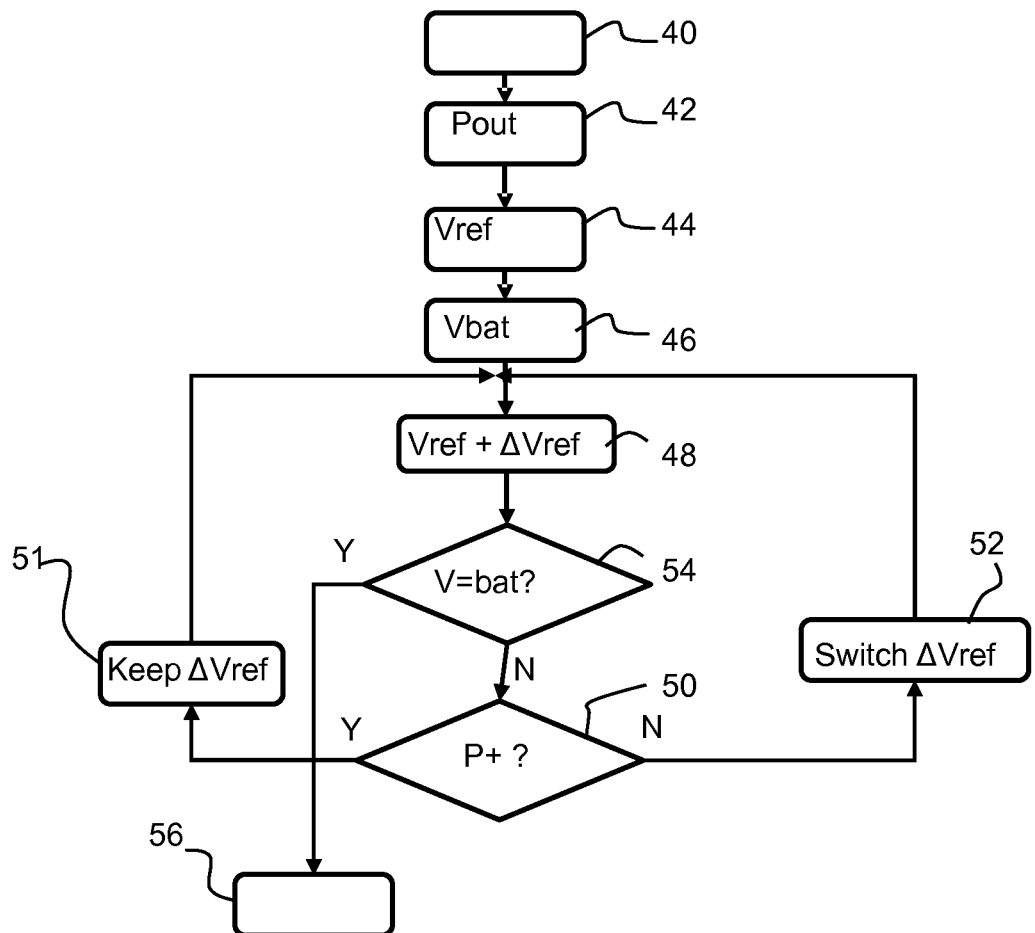
FIG. 3 shows an energy conversion method.

FIG. 3 shows the conversion method.

In step 40 energy is received from the energy source.

In step 42 the output power (Pout) of the energy source is monitored. This involves measuring the energy source voltage and current. If the energy source voltage is present and above a threshold limit, a default reference voltage is allocated to all individual conversion units in step 44 to generate a minimum output voltage for battery charging.

A start up procedure for the conversion units will happen simultaneously i.e. all conversion units will reach a nominal output range at the same time or almost same time.

In step 46, the battery voltage is read, and based on the battery state of charge, a battery charging current limit may be set. For example a low voltage at the battery indicates that boost mode charging is possible. Thus, this step may provide boost mode charging to the battery pack or to parallel connected batteries.

In step 48 the reference voltage of all the conversion units is increased by a reference step ΔVref by the controller 32. The solar system voltage and current is then read in step 50.

If the solar system output power is increasing (as determined in step 50), for example by measuring and multiplying the solar system output current and output voltage, the process is continued with the sign of the reference voltage change kept the same in step 51. Otherwise the process is reversed so the reference voltage change of all the conversion units is switched in sign (so that next time they are reduced by ΔVref) in step 52.

In this way, the input voltage of each conversion unit is changed in a first direction (increasing) starting from a reference value. There is then a check if the output power from the energy source is increasing or is decreasing. If the output power is increasing, the input voltage is changed continuously in the first direction (step 51 keeps the same sign), otherwise the input voltage is changed in a second direction opposite to the first direction (step 52 changes the sign). This provides a perturb and observe maximum power point tracking approach to find the optimum operating point for the energy source.

Figure 4:
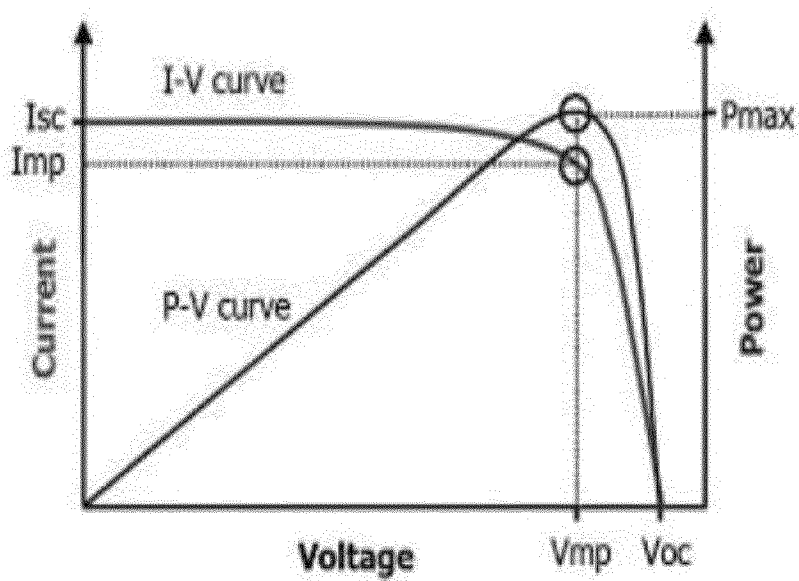
FIG. 4 shows current versus voltage and power versus voltage plots to explain the maximum power point tracking function.

FIG. 4 shows current versus voltage and power versus voltage plots to explain the maximum power point tracking function.

Vmp and Imp represent the solar system voltage and solar cell current at the maximum power point Pmax. Voc is the open circuit voltage and Isc is the short circuit current. In the perturb and observe approach, the voltage of each conversion unit and the solar system output voltage increases, and so increases the output power of the solar cell, until the point Pmax is reached. Once the voltage of the solar system exceeds Vmp corresponding to the maximum power Pmax, the controller detects that the output power drops, and the controller instructs each conversion unit to decrease its voltage. Finally the system will be stable around Vmp and Pmax.

As the solar incident intensity changes with time throughout the day or due to cloud cover, the maximum power point Pmax will change, and the system dynamically moves to the new Vmp and Pmax point.

The system will be stable (at a small oscillation) at the maximum power point of the solar cell.

Of course other known maximum power point tracking approaches may be used.

The step size ΔVref may be decided based on the required MPPT dynamic efficiency and response time requirements.

This process will continue until the battery has reached its target voltage as detected in step 54 or at the end of boost charging or at the end of solar power availability.

The example above is based on providing the same reference voltage Vref to all series connected conversion units. This is based on the assumption that all conversion units have the same rated power. This will ensure almost equal voltage sharing among the conversion units. However, small differences in voltage sharing will cause power sharing among them, which is not a harmful operation if the conversion units operate within the rated power, voltage and current limits. As explained further below, it is not essential that the conversion units have the same rated power.

The method may further comprise (not shown in FIG. 3) monitoring the solar current and input voltage of the conversion units so that if the input power is more than a rated power, the conversion unit will use a burst mode operation for a specified time, to keep the conversion unit operation alive and reduce the risk of failure and come back to the normal operation.

At the end of boost charging, the battery needs to be charged with a constant voltage. The battery may however require less power than the available solar power. In this case, the controller 32 may maintain a constant voltage access the battery and modify the reference voltage Vref accordingly so that suitable amount of power is transferred from input to output. This is shown as step 56. Here the solar cell is not converted at its maximum power point, but under the maximum power point.

The example above is based on providing the same reference voltage to the conversion units. In another example, the reference generated by controller 32 can be different for different conversion units to enable different power transfer by each conversion unit to charge the battery arrangement.

In this way, one or more of the conversion units may be operated at a higher power compared to the other series connected conversion units. Conversion units of different power rating may be operated at a different power as well by providing different reference voltages from the controller 32.

The reference voltages may then be selected depending on the different rated power of the different conversion units. The size of the step change in the reference voltage may also be set to different levels for different conversion units, again for example proportional to their different rated power.

The setting of different references may be settable from a remote control or software applications, enabling the battery charging station to charge a customer differently based on the selected charging rate.

This is of interest for legacy systems where there are already different wattage conversion units, and a new conversion unit with a different power rating is to be added. Power rate adjustment is needed to prevent that any of the lower rated conversion units fail by transferring excess power and hence perform at overrated levels. With proper voltage sharing, the overall system is able to operate at a desired peak maximum power point. For new installations, it will typically be preferred to have the same power conversion units in series for easy control with the same reference applied to each.

Only one example of maximum power point tracking approach has been described above, based on a perturb and observer approach. However, other methods may be used for setting the overall system to be at the maximum power point.

The perturb and observe approach is most common due to its ease of implementation. A first alternative approach is an incremental conductance method, by which incremental changes in current and voltage are measured to predict the effect of a voltage change. This method utilizes the incremental conductance (dI/dV) of the solar system to compute the sign of the change in power with respect to voltage. A second alternative approach is a current sweep method which uses a sweep waveform for the solar system current such that the I-V characteristic of the PV array is obtained and updated at fixed time intervals. The maximum power point voltage can then be computed from the characteristic curve. A third alternative approach is a constant voltage approach in which the output voltage is regulated to a constant value or a constant ratio to a measured open circuit voltage.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power conversion system to be used with an energy source, comprising:
   a plurality of conversion units, each comprising a pair of input terminals and a pair of output terminals, wherein the input terminals are connected in series with the energy source, wherein the positive input terminal of a first converter and the negative input terminal of a last converter of the series are for connection to an output of the energy source, and for each two neighboring converters in this series a negative input terminal pin of an upstream converter is connected to a positive input terminal of a downstream converter which both input terminals are decoupled from the energy source except for the positive input terminal of the first converter and the negative input terminal of the last converter;

a master monitor unit adapted to monitor the output power of the energy source; and a controller adapted to control the input voltage of each conversion unit synchronously in dependence on the monitored output power.

2. The system as claimed in claim 1, wherein the output terminals are connected in parallel, and said controller is adapted to:
detect a total output voltage from the energy source; and
set a reference voltage for each conversion units;
and each conversion units is associated with a drive circuit to generate and provide the conversion unit an output based on the difference between the reference voltage set by the controller and a feedback of the individual differential voltage of each conversion unit.

3. The system as claimed in claim 1, wherein the controller is adapted to:
simultaneously change the input voltage of each conversion unit in a first direction starting from a reference value;
check if the output power is increasing or is decreasing; and
continue to simultaneously change the input voltage in the first direction if the output power is increasing; otherwise simultaneously change the input voltage in a second direction opposite to the first direction.

4. The system as claimed in claim 1, wherein:
the plurality of conversion units have the same rated power, and the controller is adapted to set the same input voltage and the same step of a change in the input voltage for the plurality of conversion units; or
the plurality of conversion units have different rated power, and the controller is adapted to set an input voltage and the step of a change in the input voltage for the plurality of conversion units depending on their different rated power.

5. The system as claimed in claim 4, wherein the plurality of conversion units have the different rate power, and the controller is adapted to set an input voltage and the step of the change in the input voltage for the plurality of conversion units proportional to their different rated power.

6. The system as claimed in claim 1, wherein each conversion unit comprises a switched mode power supply with main power switch, wherein a duty cycle of a control voltage applied to the main power switch determines the input voltage, wherein the controller is adapted to control the duty cycle.

7. The system as claimed in claim 1, wherein the output terminals of the conversion units are for connection to a battery pack.

8. The system as claimed in claim 1 which is scalable by adding an additional conversion unit by connecting the input terminals of the additional conversion unit within the series connection of input terminals of the plurality of conversion units.

9. A solar power generation system comprising:
a set of solar panels; and
a power conversion system as claimed in claim 1, with the end input terminals connected to the set of solar cells.

10. The system as claimed in claim 9, further comprising a battery arrangement connected to the output terminals.

11. The system as claimed in claim 9, wherein output terminals of the solar panels are connected in series and the set of solar panels is scalable by adding an additional solar panel by connecting the additional solar panel in series with the set of solar panels, wherein the positive output terminal of a first solar panel and the negative output terminal of a last solar panel of the series are for connection respective to positive input terminal of the first converter and the negative input terminal of the last converter, and for each two neighboring solar panel in this series a negative output terminal pin of an solar panel is connected to a positive output terminal of a downstream solar panel which both output terminals are decoupled from the converters except for the positive output terminal of the first solar panel and the negative output terminal of the last solar panel.

12. A power conversion method, comprising:
receiving energy from an energy source;
providing a plurality of conversion units, each comprising a pair of input terminals and a pair of output terminals, wherein the input terminals are connected in series with the energy source and positive input terminal of a first converter and the negative input terminal of a last converter of the series are connected to the energy source, wherein for each two neighboring converters in this series a negative input terminal pin of an upstream converter is connected to a positive input terminal of a downstream converter which both input terminals are decoupled from the energy source except for the positive input terminal of the first converter and the negative input terminal of the last converter;
monitoring the output power of the energy source; and
controlling the input voltage of across each conversion unit synchronously in dependence on the monitored output power.

13. The method as claimed in claim 12, comprising:
simultaneously changing the input voltage of each conversion unit in a first direction starting from a reference value;
checking if the output power from is increasing or is decreasing; and
continuing to simultaneously change the input voltage in the first direction if the output power is increasing; otherwise simultaneously changing the input voltage in a second direction opposite to the first direction.

14. The method as claimed in claim 12, wherein:
the plurality of conversion units have the same rated power and the method comprises setting the same input voltage and the same step of change of the input voltage for the plurality of conversion units; or
the plurality of conversion units have different rated power and the method comprises setting an input voltage and the step of change of the input voltage for the plurality of conversion units depending on their different rated power.

15. The method as claimed in claim 12, wherein each conversion unit comprises a switched mode power supply with a main power switch, and the method comprises setting an input voltage by controlling a duty cycle of a control voltage applied to the main power switch.

* * * * *